July 2, 1963

W. D. NOBLES ETAL 3,095,818

FLOW CONTROL MEANS FOR A PUMPING STATION

Filed Dec. 4, 1961

PETER E. CARDILLO
WILBUR D. NOBLES
INVENTORS

PETER E. CARDILLO
WILBUR D. NOBLES
INVENTORS

BY Daniel W. Bohis
atty

United States Patent Office 3,095,818
Patented July 2, 1963

3,095,818
FLOW CONTROL MEANS FOR A PUMPING STATION
Wilbur D. Nobles, Upper Montclair, and Peter E. Cardillo, Irvington, N.J., assignors to Worthington Corporation, Harrison, N.J., a corporation of Delaware
Filed Dec. 4, 1961, Ser. No. 156,838
14 Claims. (Cl. 103—11)

This invention relates to a pumping station and more particularly to a flow control means of the type shown in United States Patent 2,950,683 granted to Wilbur R. Leopold et al. on February 7, 1956, and assigned to Worthington Corporation, the present assignee.

The control means of the foregoing patent is particularly effective in providing a station, having nominal variable flow thereto, with the greatest possible power savings.

This is accomplished, as is more fully described in the above mentioned patent, with the provision of means whereby the capacity of a pump or a series of pumps may be varied in accordance with the flow into the station. Said another way, the foregoing control eliminates the impractical, expensive and costly operation of a station which results from the operation of all the pumps in such a system or the operation of one or more of them at maximum speed and capacity when the flow to said station does not require such pumping capacity.

In other installations, particularly in those where storm waters are frequently handled, further power savings may be obtained as is described in Patent 2,791,179 by raising or lowering the reference level in the suction reservoir as successive units come into or are taken out of operation. Specifically the added suction head is utilized to compensate for the increase in discharge head resulting from the increased flow in the discharge conduits of the station. This is accomplished by raising the reference level to a maximum position in the suction reservoir as the last pump is actuated into operation.

An additional improvement is disclosed by Patent 2,950,683 wherein it is contemplated that, and particularly during normal operation of the station, the optimum suction reservoir level is selected as a reference level for the control means. In other words, it is intended that the station operate with the minimum permissible static head during its normal operation.

The flow control means discussed hereinabove and currently employed in the art for generally equating inflow to a pumping station with the outflow are based on the same or similar concepts. Thus, there is an indicator means for measuring the level in the reservoir of the pumping station and this indicator means is in turn connected through a control means to a magnetic drive which interconnects the motor and the pump to regulate the amount of excitation passing through the drive to thereby provide a pump speed as required by the conditions in the suction reservoir.

Within the broad limits just defined and particularly in the portion of the flow control means comprising the control portion there is much room for improvement. From a practical standpoint many of the systems employed embody elements which are complex, expensive to manufacture and maintain.

The present invention eliminates the foregoing objections and provides a variable flow control means for use with a pumping station control means which is made or constructed of readily available standard materials and is of simple construction thereby providing a device of low cost of manufacture which is readily accessible for maintenance and easily repaired by those individuals who are responsible for the operation of the unit.

It is an object of the present invention to provide a variable flow control means which eliminates the objections present in prior type units.

Other objects and advantages of the invention including the basic design and the nature of the improvements thereon will appear from the following description taken in conjunction with the following drawings, in which.

Figures 1, 2:
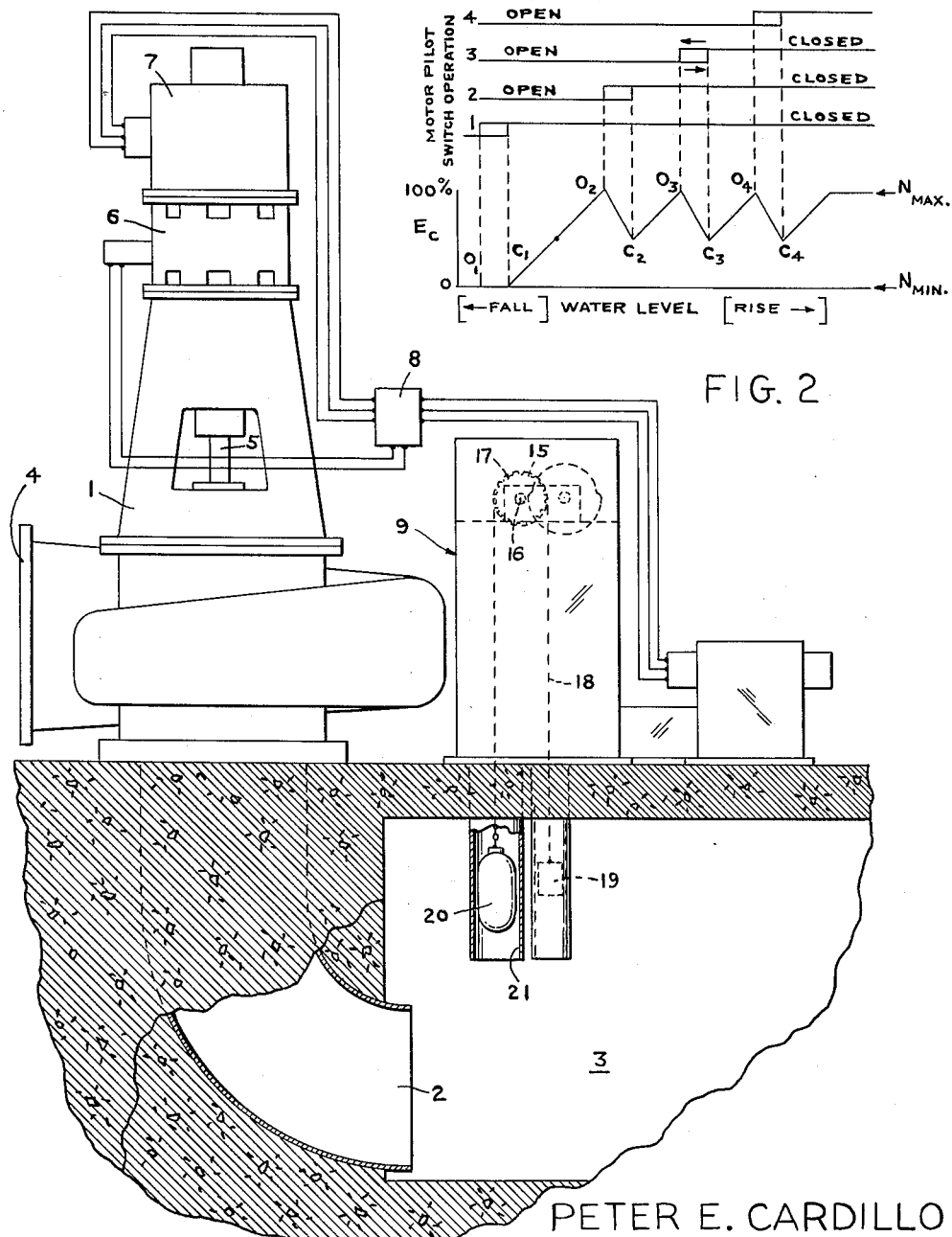
FIGURE 1 is a diagrammatic view of a pumping unit showing the present invention embodied therein.
FIGURE 2 is a graphic illustration showing the operation of the variable flow control means in its function of starting and stopping pumps and further increasing or decreasing the speed thereof from a minimum to a maximum rate.

Referring more particularly to the drawings, FIGURE 1 thereof illustrates a pumping system embodying the present invention, wherein the pump 1, which may be of any approved type of centrifugal pump applicable for use in the pumping conditions to be met, has its suction 2 connected to a source of liquid to be pumped (not shown) which, in the present instance is reservoir 3. The pump 1 discharges through its discharge outlet 4 to any suitable point of discharge. The driving shaft 5 of the pump 1 is connected to a magnetic drive or speed regulating means 6 which is in turn driven by an electric motor 7.

The pumping system herein illustrated employs an electrical control 8 in connection with the magnetic drive 6, of the character illustrated in Patent 2,733,660 to provide adjustable, pre-selected speed of the shaft 5, and consequently of the pump 1. A liquid level operated variable flow control means 9 generally shown in FIGURE 1 and schematically shown in FIGURE 3 in association with the electrical control 8 will provide control of the speed operation of the pump 1 in substantially stepless increments, the steps in speed variation being so small as to be unnoticeable.

The magnetic drive and electrical control hereinabove referred to are well known in the art and purchasable on the open market. Accordingly, it is to be understood that other applicable magnetic drives or other applicable electrical controllers than those shown herein and referred to above may be employed without departing from the spirit of the invention.

Figure 3:
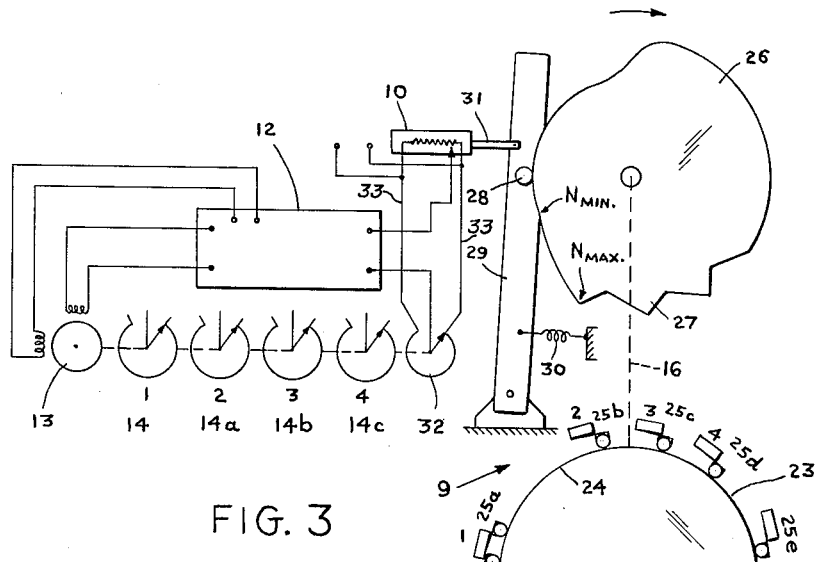
FIGURE 3 is a schematic illustration of the indicator means and control portion of the variable flow control means contemplated herein.

The fluid level variance operated flow control means 9 shown in FIGURE 3 which operates a control which in turn moves a sensing means 10 shown as a potentiometer rheostat which senses changes in suction reservoir level through a means 12 shown as a servo-amplifier to start a motor means 13 to move variable speed control means shown as potentiometers 14, 14a, 14b and 14c which adjust the speed of operation of the pump 1 or pumps with which they are associated through the corresponding magnetic drives as above described is shown in detail in FIGURES 1 and 3 of the drawings.

The indicator means generally designated 15 of the variable flow control 9 includes a shaft 16 supported from a suitable pedestal. A sprocket wheel or rotary element 17 is connected to the shaft 16 and includes means for imparting rotation thereto such as a chain 18. The chain 18 has a counterweight 19 attached to one end thereof and the other end is connected by any well known manner to a float 20 which is located in a float tube or float well 21. The bottom of or open lower end of the float tube extends into the suction reservoir 3 below the normal level of liquid therein so that variances in the level will move the float 20. Movement of the float under variances of the liquid level in the suction reservoir 3 will, through the sprocket chain 18, rotate the sprocket 17 and shaft 16.

Figure 4:
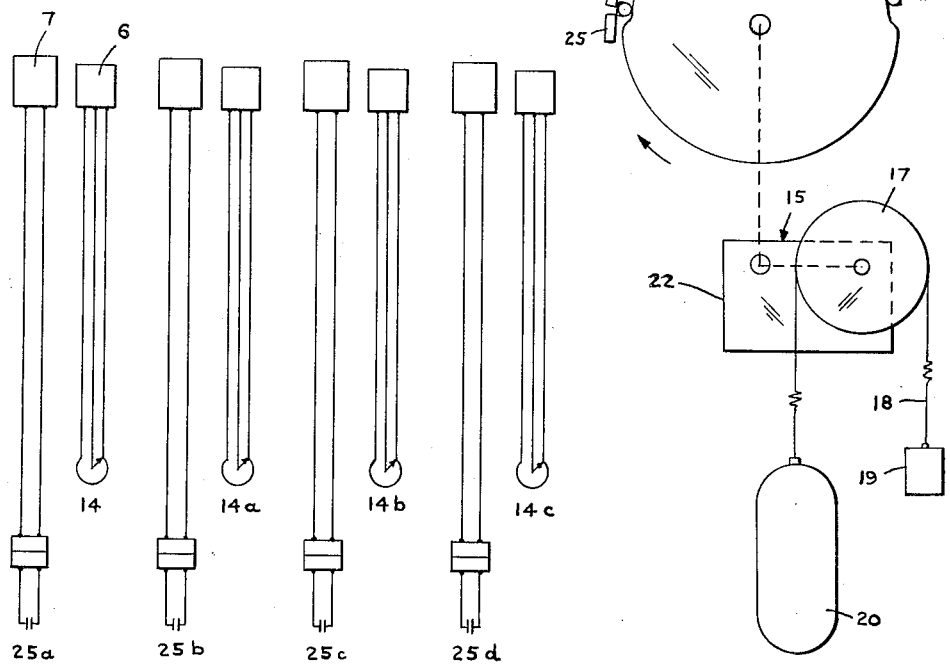
FIGURE 4 is a schematic diagram showing the circuits which interconnect the variable speed control means to the magnetic drives and the switching means to the driving means of the pumps.

A speed reduction unit 22 is disposed between the indicator means and the portion of the shaft 16 that is or has connected thereto a first cam 23, cam 23 including cam surface 24 disposed relative the switching means $25a$, $25b$, $25c$, $25d$ and $25e$. The action of the indicator means is transmitted through speed reduction unit 22 to cam 23 and upon rotation thereof the cam will actuate the switches which are connected as is shown in FIGURE 4 to the driving means of the pumps to start or stop same depending on the movement of the cam 23. In addition to providing switching means for starting and stopping the respective motors of the pumps it will be readily understood that switches for signalling high and/or low level conditions may also be incorporated in association with cam 23. In this connection switch $25e$ is set so that upon actuation thereof a high level alarm in the station is signalled into operation indicating that conditions in the station are beyond those normally desired. Switch 25 is set to actuate a low level alarm.

It is preferable to set the potentiometers 14, $14a$, $14b$ and $14c$ to permit excitation through the respective magnetic drives to be at a minimum level so that when a pump or driving means thereof is started the pump will be operating at minimum speed.

In order to raise the speed of the pump in accordance with the inflow to the suction reservoir a speed control cam 26 shown in FIGURE 3 and including means 27 associated therewith which incorporate the desired type of speed control is connected to the shaft 16. It will be evident that variances in reservoir level will be transmitted to the sensing means 10 through a roller 28 mounted on a movable member 29 which is held in abutment with the cam 26 by a spring member 30. In this fashion movement of cam 26 is transmitted to sensing means 10 through movable member 29 which is connected to this sensing element by lever member 31. The servo-amplifier 12 being connected to the motor means 13 at one end and to the sensing element 10 at the other end functions to start the motor means when the sensing element is moved as a result of a change in suction reservoir level. It is clear from FIGURE 3 that when sensing element 10 is moved the servo-amplifier 12 is energized by electricity flowing in lines 33. More particularly, and as was mentioned above, change in reservoir level is transmitted by float 20, through shaft 16 to cam 26. Cam 26 in turn moves member 29 which in turn moves sensing element 10 through lever member 31. The motor means is actuated into operation by the servo-amplifier and continues to run until variable speed control or potentiometer 32 is in balance with sensing means or potentiometer 10. That is motor means 13 will move the potentiometer or potentiometers 14, $14a$, $14b$ and $14c$ to regulate the pump speed and as a consequence the pump output until the reference level in the reservoir is adjusted to a desired level. In adjusting the reservoir level it is obvious that variations in same will be transmitted to cam 26 as above described which cam repositions sensing element 10 to a position whereby it is in balance with potentiometer 32. In this condition excitation of servo-amplifier is cut-off and electricity rather than flowing to the servo-amplifier returns to ground. In this fashion the potentiometers 14, $14a$, $14b$ and $14c$ connected to the magnetic drives are caused to permit or prevent excitation or to provide an increase or decrease in speed of the respective pumps with which they are associated.

Normal operation of the flow control is as follows:

The float rises and falls with variances in liquid level in the suction reservoir 3. The rise and fall of the float moves the chain 18 which rotates the sprocket 17 which in turn through speed reduction gear 22 rotates the first cam 23 and second cam or speed control cam 26. When the cam surface of the first cam 23 engages the first switch $25a$ a first pump is started at a predetermined speed. An inflow raises the well level the movement of the speed control cam 26 which in turn through movable member 29 moves sensing means 10 to reflect this continued change in condition in the reservoir level. A change in the sensing means causes servo-amplifier 12 to start the motor means 13 which in turn, if the conditions are such that the wet well level has risen moves potentiometer 14 to permit greater excitation to pass to the magnetic drive and thusly increase the speed of pump 1 so that it can handle the inflow rate. When the motor means 13 has moved potentiometer 14 to a point wherein the pump associated therewith is balancing the inflow with the outflow sensing means 10 will through the indicator means and control means reflect this condition. In addition motor means 13 will have adjusted potentiometer 32 so that it is in balance with sensing means 10 at which time the action of the servo-amplifier 12 on the motor means will have been nullified.

In a situation where inflow to the station is such that one pump is not capable of handling same and referring to FIGURE 2 the portion thereof setting out the configuration of cam 26, it is pointed out that first pump will hit a maximum and as inflow continues indicator means 15 will move cam 26 to a position whereby it starts slowing the first pump down. Note the portion of cam past ridge $o_2$ is designed to move the controls to accomplish this purpose. When the first pump is slowed to a point $c_2$ in the first valley of the cam a second pump is started at a predetermined speed as cam 23 actuates switch $25b$. The pump speed as flow increases into the station will rise and any number of pumps will be actuated into operation according to the procedure described hereinabove for two pumps.

In the event that conditions are such that inflow to the station falls and assuming that two pumps are operating and at a maximum rate cam 26 will have through sensing means 10 actuated motor means 13 to position potentiometers 14 and $14a$ at a position wherein maximum excitation through the magnetic drive is permitted. The roller 28 will lie at a position on cam 26 corresponding to the peak $o_3$. The pumps due to the operation described above will be slowed down as the controls are influenced by incline between $o_3$ and $c_2$ of cam 26 shown in FIGURE 2.

As cam 23 starts to actuate switch $25b$, due to a lost motion characteristic built therein and which is a common feature in switches of this nature and readily purchased on the open market, shut-off of pump 2 does not occur until cam 26 has influenced the various controls to bring both pumps to a speed corresponding to that set at point $o_2$.

This same procedure will be followed for any number of pumps and is believed evident from above description when considered in connection with FIGURE 2.

Although the invention has been described with reference to specific apparatus it will be appreciated that a wide variety of changes may be made within the ability of one skilled in the art without departing from the scope of this invention. For example, some of the components of the invention may be used independently of others and equivalents may be substituted for the apparatus, all within the spirit and scope of the invention as defined in the appended claims.

What is claimed is:

1. Variable flow control means for use with a pumping system having a suction reservoir, said pumping system including a pump, driving means for said pump, speed regulating means operatively interconnecting said pump to said driving means for varying the power flow of said driving means to said pump, said variable flow control means including indicator means for measuring the level in said suction reservoir, said indicator means including switch means connected to said driving means to start and stop said pump, a control connected to said indicator means, sensing means operated by the control means to sense a change in level in the suction reservoir, variable speed control means connected to the speed regulating means, a motor means connected to the variable speed control means, means interconnecting the motor means to the sensing means to start said motor means when said sensing means senses a change in level in the suction reservoir, and a variable control means interconnecting said means interconnecting the motor means to the sensing means with said sensing means to stop said motor means when a desired level is reached in said suction reservoir.

2. Variable flow control means for use with a pumping system having a suction reservoir, said pumping system including a pump, driving means for said pump, speed regulating means operatively interconnecting said pump to said driving means for varying the power flow from said driving means to said pump, said variable flow control means including indicator means for measuring the level in said suction reservoir, a first cam connected to said indicator means and rotatable therewith, switch means spaced relative said first cam and connected to said driving means so that said pump means is started or stopped upon actuation of said switch means by said first cam, a speed control cam connected to said indicator means, sensing means operated by the speed control cam to sense a change in level in the suction reservoir, variable speed control means connected to the speed regulating means, a motor means connected to the variable speed control means, means interconnecting the motor means to the sensing means to start said motor means when said sensing means senses a change in level in the suction reservoir, and a variable control means interconnecting said means interconnecting the motor means to the sensing means with said sensing means to stop said motor means when a desired level is reached in said suction reservoir.

3. The variable flow control means claimed in claim 2 wherein said speed control cam includes means thereon coacting with said sensing means, said motor means, and said first variable speed control means to raise or lower the speed of said pump in stepless increments.

4. The variable flow control means claimed in claim 3 wherein the indicator means includes, a rotary element, a float movable by variances in the suction reservoir level, means operatively interconnecting said float to said rotary element so that said float movement is transmitted to said rotary element, and a speed reducing means operatively interconnecting said rotary element to said first cam and said speed control cam.

5. The variable flow control means claimed in claim 4 wherein said sensing means comprises a potentiometer and means including a roller mounted on a movable member interconnect said sensing means to said speed control cam to transmit changes in suction reservoir level to said sensing means.

6. Variable flow control means for use with a pumping system having a suction reservoir, said pumping system including a plurality of pumps, driving means for each of said pumps, speed regulating means operatively interconnecting each of said pumps to each of said driving means for varying the power flow from said driving means to its corresponding pump, said variable flow control means including indicator means for measuring the level in said suction reservoir, said indicator means including a plurality of switch means connected to each of said driving means to start and stop the corresponding pump with which it is associated, a control connected to said indicator means, sensing means operated by the control means to sense a change in level in the suction reservoir, variable speed control means connected to each of the speed regulating means, a motor means connected to each of the variable speed control means, means interconnecting the motor means to the sensing means to start or stop said motor means when said sensing means senses a change in level in the suction reservoir, and a variable control means interconnecting said means interconnecting the motor means to the sensing means with said sensing means to stop said motor means when a desired level is reached in said suction reservoir.

7. Variable flow control means for use with a pumping system having a suction reservoir, said pumping system including a plurality of pumps, driving means for each of said pumps, speed regulating means operatively interconnecting each of said pumps to each of said driving means for varying the power flow from said driving means to its corresponding pump, said variable flow control means including indicator means for measuring the level in said suction reservoir, a first cam connected to said indicator means and rotatable therewith, a plurality of switch means spaced relative said first cam and connected to each of said driving means so that said corresponding pumping means is started or stopped upon actuation of the corresponding switch means by said first cam, a speed control cam connected to said indicator means, sensing means operated by the speed control means to sense a change in level in the suction reservoir, variable speed control means connected to each of the speed regulating means, a motor means connected to each of the variable speed control means, means interconnecting the motor means to the sensing means to start said motor means when said sensing means senses a change in level in the suction reservoir, and a variable control means interconnecting said means interconnecting the motor means to the sensing means with said sensing means to stop said motor means when a desired level is reached in said suction reservoir.

8. The variable flow control means claimed in claim 7 wherein said speed control cam includes means thereon coacting with said sensing means, said motor means, and said first variable speed control means to raise or lower the speed of said pump in stepless increments.

9. The variable flow control means claimed in claim 8 wherein the indicator means includes, a rotary element, a float movable by variances in the suction reservoir level, means operatively interconnecting said float to said rotary element so that said float movement is transmitted to said rotary element, and a speed reducing means operatively interconnecting said rotary element to said first cam and said speed control cam.

10. The variable flow control means claimed in claim 9 wherein said sensing means comprises a potentiometer and means including a roller mounted on a movable member interconnect said sensing means to said speed control cam to transmit changes in suction reservoir level to said sensing means.

11. The variable flow control means claimed in claim 10 wherein said means interconnecting the motor means to the sensing means comprises a servo-amplifier.

12. Variable flow control means for use with a pumping system having a suction reservoir, said pumping system including a pump, driving means for said pump, speed regulating means operatively interconnecting said pump to said driving means for varying the power flow from said driving means to said pump, said variable flow control means including indicator means for measuring the level in said suction reservoir, a first cam connected to said indicator means and rotatable therewith, switch means spaced relative said first cam and connected to said driving means so that said pump means is started or stopped upon actuation of said switch means by said first cam, a speed control cam connected to said indicator means, sensing means operated by the speed control cam to sense a change in level in the suction reservoir, variable speed control means connected to the speed regulating means, a motor means connected to the variable speed control means, a servo-amplifier interconnecting the motor means to the sensing means to start said motor means when said sensing means senses a change in level in the suction reservoir, and a variable control means interconnecting said servo-amplifier with said sensing means to stop said motor means when a desired level is reached in said suction reservoir.

13. The variable flow control means claimed in claim 12 wherein said speed control cam includes means thereon coacting with said sensing means, said motor means, and said first variable speed control means to raise or lower the speed of said pump in stepless increments.

14. Variable flow control means for use with a pumping system having a suction reservoir, said pumping system including a plurality of pumps, driving means for each of said pumps, speed regulating means operatively interconnecting each of said pumps to each of said driving means for varying the power flow from said driving means to its corresponding pump, said variable flow control means including indicator means for measuring the level in said suction reservoir, a first cam connected to said indicator means and rotatable therewith, a plurality of switch means spaced relative said first cam and connected to each of said driving means so that said corresponding pumping means is started or stopped upon actuation of the corresponding switch means by said first cam, a speed control cam connected to said indicator means, sensing means operated by the speed control means to sense a change in level in the suction reservoir, variable speed control means connected to each of the speed regulating means, a motor means connected to each of the variable speed control means, a servo-amplifier interconnecting the motor means to the sensing means to start said motor means when said sensing means senses a change in level in the suction reservoir, and a variable control means interconnecting said servo-amplifier with said sensing means to stop said motor means when a desired level is reached in said suction reservoir.

References Cited in the file of this patent

UNITED STATES PATENTS

| | | |
|---|---|---|
| 2,482,496 | McGillivray | Sept. 20, 1949 |
| 2,791,179 | Dorer | May 7, 1957 |
| 2,806,157 | Dustman | Sept. 10, 1957 |
| 2,950,683 | Leopold et al. | Aug. 30, 1960 |
| 3,017,527 | La Vallee | Jan. 16, 1962 |
| 3,024,730 | Jowle | Mar. 13, 1962 |